United States Patent Office 3,468,964
Patented Sept. 23, 1969

3,468,964
HYDROGENATION PROCESS
Frederic Wurl Swamer, West Chester, Pa., assignor to E. I. du Pont de Nemours and Company, Wilmington, Del., a corporation of Delaware
No Drawing. Filed Aug. 3, 1965, Ser. No. 476,997
Int. Cl. C07c *31/34, 33/10*
U.S. Cl. 260—633
10 Claims

ABSTRACT OF THE DISCLOSURE

A hydrogenation process for converting perfluoroalkyl aldehydes, ketones or nitriles, in the vapor phase, to corresponding alcohols or ketones employing hydrogen and a palladium on activated alumina catalyst at 25–170° C. and atmospheric pressure.

---

Perfluoroaldehydes, perfluoroketones and perfluoronitriles are well known in the art and are readily available. In general, the products obtained by the reduction of these compounds, highly fluorinated primary and secondary alcohols and primary amines, are known to the art and to be useful for many purposes. The commercialization of such products has, however, been hampered by the expense of preparation. Two general methods have been used for the reduction of perfluoroaldehydes, perfluoroketones and perfluoronitriles, (a) catalytic reduction with hydrogen over certain catalysts, or (b) reaction with metal hydrides, particularly lithium aluminum hydride. Metal hydrides are too expensive to be of commercial interest. The hydrogen reductions heretofore have required very high temperatures or high pressures or both which add greatly to their cost.

For example, in Belgian Patent 632,188, Gordon et al. disclose that tetrafluorodichloroacetone can be hydrogenated in the liquid phase to tetrafluorodichloroisopropanol at temperatures below 100° C. and pressures of between 2 and 18 kg./cm²., preferably between 4 and 11 kg./cm.² in the presence of Adam's catalyst, $PtO_2 \cdot 2H_2O$, in an autoclave in from 1 to 22 hours. In Belgian Patent 634,368, Hollander et al. disclose that hexafluoroacetone can be hydrogenated in the gas phase to hexafluoroisopropanol in the presence of a copper chromite catalyst at 200–450° C. and ordinary pressures, and that the catalyst may be supported on an alkaline earth fluoride, such as calcium fluoride.

In U.S. Patent 2,824,897, Wujciak et al. disclose that primary, secondary and tertiary polychlorofluoro alcohols can be prepared by the reduction of various materials, including ketones and aldehydes, in ether or other solvents. They disclose a wide variety of reducing agents. They also disclose that they can use catalytic hydrogenation under pressures of from 5 to 1,000 p.s.i.g., employing various catalysts which incidentally include palladium, but prefer copper chromite. In Example 12, they hydrogenate a ketone over Raney nickel at a pressure of at least 1,000 pounds pressure at 100° C. They do not provide any example of the hydrogenation of any ketone or aldehyde or of any other compound in the presence of any palladium catalyst.

On the other hand, Gordon et al., in U.S. Patent 2,917,546, disclose that the vapor phase hydrogenation of sym-tetrafluorodichloroacetone in the presence of palladium supported on activated carbon or on calcium fluoride and the like at 125–350° C. and atmospheric or higher pressures produces tetrafluoroacetone in which the chlorine atoms are replaced by hydrogen atoms without affecting the carbonyl (CO) group, no alcohol being obtained in the product.

Smith et al., in U.S. Patent 2,982,789, discloses that trifluoroacetaldehyde can be converted to trifluoroethanol by hydrogenation in the vapor phase in the presence of copper chromite catalyst at ordinary pressure and 200–300° C., preferably 240–275° C., and that little or no reaction occurs below 200° C. They also disclose that they can hydrogenate trifluoroacetyl chloride to the aldehyde in the gas phase at 130–250° C. in the presence of palladium on activated carbon, but that attempts to further hydrogenate the aldehyde to the alcohol over this catalyst, as by using higher temperatures, were unsuccessful, resulting only in fragmentation of the organic material to HF, C, CO and $CHF_3$; and that the copper chromite catalyst failed to hydrogenate the trifluoroacetyl chloride.

Gilman et al., in J. Am. Chem. Soc., 65, 1458–1460 (1943), disclose the catalytic hydrogenation of trifluoroacetonitrile in ether at 50–60° C. and hydrogen pressures above 1,000 lbs./sq. in. in the presence of liberal quantities of Adams' platinum catalyst to produce trifluoroethyl amine.

Gilman et al., in J. Am. Chem. Soc., 70, 1281–1282 (1948), disclose that trifluoroisopropanol can be obtained by the catalytic hydrogenation of trifluoroacetone in the presence of Adams catalyst and water at room temperature and pressure of 760 lbs./sq. in.

It is an object of this invention to provide an improved hydrogenation process for preparing highly fluorinated alcohols and amines from perfluoroaldehydes, perfluoroketones and perfluoronitriles. Another object is to employ in such a process a novel catalyst therefor. A further object is to provide such a process which employs atmospheric pressures and moderate temperatures and which is readily operated in a more economical manner. Other objects are to advance the art. Still other objects will appear hereinafter.

The above and other objects are accomplished by the process which comprises (A) contacting with a catalyst which consists of from about 0.1% to about 1% by weight of metallic palladium on activated alumina (B) at a temperature of from about 25° C. to about 170° C. and about 1 atmosphere pressure, (C) a vapor phase mixture of a perfluoro compound of the group consisting of compounds having the formula $R_f$—CO—$R_f$, $R_f$—CHO and $R_f$CN wherein $R_f$ represents a perfluoroalkyl group of 1–12 carbon atoms and which perfluoro compound has a vapor pressure of at least 0.5 atmosphere at the temperature of the catalyst (D) and at least 1 stoichiometric amount of hydrogen, and (E) recovering from the reaction mixture a corresponding member of the group consisting of compounds of the formula $R_f$—CHOH—$R_f$, $R_f$—$CH_2OH$ and $R_fCH_2NH_2$.

It has been found that, by the use of the above defined catalyst, the hydrogenation can be successfully carried out at about atmospheric pressure and within the above defined temperature range, that higher pressures and temperatures are not required, but that materially higher temperatures are detrimental. The metallic palladium and the activated alumina support in combination are essential and coact to permit operation under the recited conditions and to obtain the desired results, neither alone being suitable and the substitution of activated carbon or other like support for the activated alumina resulting in a catalyst which cannot be used under the same conditions to produce the desired results. Thus, the use of the metallic palladium on activated alumina in the process of this invention results in considerable economic savings in investment and operating expense whereby the products can be obtained at considerably lower cost.

The metallic palladium on activated alumina, which is employed as the catalyst in the process of this invention, is available on the market as a commercial product and is made by conventional processes well known to the art. The "activated alumina" also is a commercially available product which is well known to those skilled in the art in a variety of types. Said types of "activated alumina" are prepared by the dehydration of various aluminum oxide hydrates or hydroxides, generally at temperatures below 500° C. The catalyst is prepared by soaking the activated alumina in an aqueous solution of palladious chloride ($PdCl_2$) until the proper amount of the solution is adsorbed on the alumina. Usually, the amount needed is dissolved in a limited amount of water and the solution is almost completely adsorbed by the activated alumina. The catalyst mass is then dried, say at about 120° C., and then treated with hydrogen to convert the palladious salt to metallic palladium on the activated alumina. Further activation is not required. This catalyst is saturated with hydrogen and is ready for immediate use in the process of this invention.

However, if the catalyst is subjected to conditions, such as those involved in storage and shipping, whereby hydrogen is lost therefrom and it has been contaminated with oxygen (as of air), it develops excessive heat on being first contacted with the vapor mixture of hydrogen and reactant, which heat is difficult to control. In such cases, it is usually desirable to pretreat the catalyst just before its use in the process, preferably by purging it with nitrogen to remove oxygen and then treat it with hydrogen, e.g. for about 20–30 minutes at temperatures up to about 100° C., so as to saturate it with hydrogen and thus avoid such development of excessive heat.

In the catalyst employed in this invention, the metallic palladium may be in a proportion of from about 0.1% to about 1% by weight of the catalyst mass, usually and preferably, about 0.5% by weight.

This is a vapor phase process wherein both reactants are in the vapor phase. Due to the nature of the catalyst, liquid phase reactants cannot be used.

Complete reduction of $R_fCHO$ and $R_f$—CO—$R_f$ require one mole of hydrogen to form $R_fCH_2OH$ and

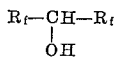

while $R_fCN$ requires two moles of hydrogen to obtain $R_fCH_2NH_2$. Although the mole ratio of $H_2$/reactant in the feed stream is not critical, controlling only the conversion of reactant to product, it is preferred to use at least the stoichiometrically required ratio to obtain complete reduction. Thus, the mole ratio $H_2/R_fCHO$ and

should be at least 1/1 and preferably somewhat larger. There is no upper limit to the proportion of hydrogen that can be used other than that dictated by convenience and economics, and is well within the knowledge and skill of those skilled in the art.

Since the reactants must be in the vapor phase, the partial pressure of the reactants in the feed stream must be less than the vapor pressure of the pure liquid reactant at the reaction temperature. Since the feed stream will usually be near one atmosphere pressure and have a mole ratio of $H_2$/reactant of more than one, the partial pressure of the reactant in the feed stream will usually be less than 0.5 atmosphere. Hence, any substance which has a vapor pressure of 0.5 atmosphere or greater will not condense.

The process will be carried out at about atmospheric pressure and at reaction temperatures of from about 25° C. to about 170° C., usually from about 100° C. to about 160° C., and most preferably from about 100° C. to about 140° C. At temperatures significantly below 25° C., the rate of reaction is undesirably slow. At temperatures materially above 170° C., the reactants tend to decompose to a serious extent and the catalyst loses activity much more rapidly, rendering the process impracticable.

In general, at about 170° C., the upper limit of the reaction temperature, reactants having normal boiling points of 180° C. or below will have vapor pressures of 0.5 atmosphere or greater. The use of the lower reaction temperatures requires, or is permitted by, the use of reactants having correspondingly lower boiling points and higher vapor pressures. In general, reactants of the formulae $R_fCHO$, $R_f$—CO—$R_f$ and $R_fCN$ wherein $R_f$ represents a perfluoroalkyl group of 1–12 carbon atoms which have a vapor pressure of at least 0.5 atmosphere at the temperature of the catalyst can be used in the process of this invention.

The reactants $R_fCHO$ and $R_f$—CO—$R_f$ are perfluoroaldehydes and perfluoroketones, respectively. Useful examples are trifluoroacetaldehyde, pentafluoropropionaldehyde, heptafluorobutyraldehyde, nonafluorovaleraldehyde, undecafluorocaproic aldehyde, pentadecafluorocaprylic aldehyde, hexafluoroacetone, octafluorobutanone, perfluoropentanone - 2, perfluorohexanone-3, perfluoropentanone-3, perfluorohexanone-2, perfluoroheptanone-2, perfluoroheptanone-3, perfluoroheptanone-4, perfluorooctanone-2, perfluorooctanone-3, perfluorooctanone-4, and the like, which yield trifluoroethanol, pentafluoropropanol-1, heptafluorobutanol - 1, nonafluoropentanol-1, undecafluorohexanol-1, pentadecafluorooctanol-1, hexafluoroisopropanol, octafluorobutanol-2, decafluoropentanol-2, dodecafluorohexanol-3, decafluoropentanol-3, dodecafluorohexanol-2, tetradecafluoroheptanol - 2, tetradecafluoroheptanol-3, tetradecafluoroheptanol - 4, hexadecafluorooctanol - 2, hexadecafluorooctanol - 3, and hexadecafluorooctanol - 4, respectively. The reactants $R_fCN$ are perfluoronitriles, such as trifluoroacetonitrile, pentafluoropropionitrile, heptafluorobutyronitrile, nonafluorovaleronitrile, undecafluorocapronitrile, pentadecafluorocaprylonitrile, and the like, yielding the amines $R_fCH_2NH_2$, such as trifluoroethylamine, pentafluoropropylamine, heptafluorobutylamine, nonafluoropentylamine, undecafluorohexylamine and pentadecafluorooctylamine, respectively.

The process of this invention is carried out by passing a vapor mixture of hydrogen and the reactant to be hydrogenated over the metallic palladium on activated alumina catalyst heated to the desired minimum reaction temperature. As the reactants contact the catalyst, heat is developed which must be in part at least removed. The most convenient apparatus for carrying out the reaction is a vertical tube or tubes containing the catalyst as a bed. Such reactors are well known for other systems of contacting gases with solids. Fluidized beds or circulating catalysts can be used in large scale operations as an aid in removing heat and permitting operation at the lower temperatures. It has also been found useful to supply the reactor with a jacket through which a cooling medium can be passed. Since the process operates most efficiently at hot spot temperatures of about 120° C. to about 140° C., atmospheric pressure steam has been found to be a useful cooling medium. If a cooling medium such as steam is not used or if other means are not provided to cool the reactor, the catalyst will tend to overheat which causes it to lose activity rapidly. Usually, cold water is not a desirable cooling medium since it tends to slow the rate of reaction undesirably.

On initial contact of the vapor mixture of reactant and hydrogen with a fixed bed of fresh catalyst saturated with hydrogen, heat is developed and a hot spot develops at the upstream end of the bed. As the operation is continued and the catalyst ages in use, the hot spot moves downstream along the bed. When the hot spot nears the downstream end of the bed, the catalyst has become mostly inactive and should be reactivated. The temperature of the catalyst, particularly of the hot spot, and the deactivation will vary and be largely dependent on the feed rates of the vapor mixture of hydrogen and reactant relative to the catalyst mass. Preferably, the feed rates and heating and cooling will be regulated so that the main body of a fixed bed of catalyst is maintained at about 100° C. and the hot spot is maintained at from about 120° C. to about 140° C. Under these preferred conditions, deactivation of the catalyst requires about 25 hours of use.

The catalyst is readily reactivated by heating with oxygen or air at about 200° C. for several hours. To insure complete removal of hydrogen before admitting oxygen, the inactive catalyst usually is first heated under a nitrogen stream for several hours at 200° C. The thus treated catalyst regains its initial activity.

The products of the reaction are collected, separated from excess hydrogen and fractionated. Separation from hydrogen is usually accomplished by totally condensing all condensible materials in a distillation column and venting the noncondensible hydrogen from the condenser. Where lower boiling reactants and/or products are involved, i.e. which normally boil below 25° C., it is often convenient to carry out this fractional distillation under pressure to avoid the necessity of using a refrigerated brine condensing medium. Higher boiling materials, e.g. normally boiling at 25° C. and above, are readily condensed at atmospheric pressure using chilled water as the condensing medium.

In general, the reactants and their products of the present process have considerably different boiling points, e.g. hexafluoroacetone, B.P. −28° C., and hexafluoroisopropanol, B.P. 59° C.; trifluoroacetonitrile, B.P. −64° C., and trifluoroethylamine, B.P. 37° C.; trifluoroacetaldehyde, B.P. −18° C., and trifluoroethanol, B.P. 74° C. Fractional distillation readily separates the desired products from unreacted starting materials. In some cases, such as those cited above, the use of a condensing medium at low temperature, or distillation at superatmospheric pressure, or both, are required. In other cases, such as with pentadecafluorooctanol, B.P. 160° C., obtained by the reduction of pentadecafluorocaprylic aldehyde, the use of distillation at somewhat reduced pressure may be desirable.

Other separation methods are available. For example, perfluoroketones and perfluoroaldehydes form strong complexes with water and other reagents. Many of these complexes are high boiling materials or otherwise lend themselves to ready separation from the alcohol reduction products, and water or such other regaents may be added to the reaction mixtures so as to form such complexes as part of the separation method.

In order to more clearly illustrate this invention, representative modes of practicing it, and advantageous results to be obtained thereby, the following examples are given, in which the parts and proportions are by weight except where specifically stated otherwise.

Example 1.—Hydrogenation of hexafluoroacetone

A 1.9 cm. x 33.1 cm. borosilicate glass tube was arranged vertically containing a borosilicate glass thermowell at the center, feed lines for gases, and an exit line connected to two traps in series cooled in ice water and carbon ice-acetone, respectively. The reactor was charged with 32 gms. (35 cc.) of 0.5% Pd on 14 mesh activated alumina granules (a commercial product). The reactor was purged with nitrogen and then treated with hydrogen for 20 minutes. Hydrogen at about 50 cc./min. and at one atmosphere pressure and hexafluoroacetone at about 25 cc./min. and at one atmosphere pressure were fed into the reactor. The temperature of the top portion of the catalyst bed rose to 120° C. and remained there, while the rest of the catalyst remained relatively cool. When both the hydrogen and the hexafluoroacetone rates were increased proportionately, the catalyst temperature also increased. The hexafluoroacetone and hydrogen feed rates were adjusted to about 50 cc./min. and 80–100 cc./min., respectively, whereupon the catalyst hot spot temperature rose to about 150–157° C. and remained at that temperature for the rest of the operation. The operation was continued for four hours, during which time 75.5 gms. of liquid was collected in the ice cooled trap. A small amount of liquid was also collected in the carbon ice-acetone cooled trap.

The liquid collected in the ice cooled trap was identified by vapor phase chromatography and mass spectroscopy as 1,1,1,3,3,3-hexafluoropropan-2-ol, indicating a substantially 100% yield of the alcohol and a 100% conversion of the hexafluoroacetone.

Example 2.—Reactivation of catalyst

After hydrogenation for a total period of 25 hours (intermittent), the catalyst of Example 1 gradually lost activity, indicated by the "hot spot" gradually moving down the catalyst bed. Toward the end of the period, the effluent product contained increasing amounts of unreacted hexafluoroacetone.

The inactivated catalyst was heated to 200° C. and purged with nitrogen, then treated with pure oxygen at 200° C. for a period of four hours, again purged with nitrogen and cooled. After reheating to 200° C., the catalyst was treated with a stream of pure hydrogen for a three hour period, purged with nitrogen, and cooled.

The reactivated catalyst was employed in the hydrogenation of hexafluoroacetone under the conditions of Example 1, i.e. at a hot spot temperature of about 120° C. and 1 atmosphere pressure. Hexafluoroisopropanol was again produced in high purity, and substantially 100% conversion and yield.

Example 3.—Hydrogenation of hexafluoroacetone

The reactor consisted of a 75.3 cm. section of 64 mm. nickel pipe, surrounded over a 61 cm. length by a steel jacket and containing inlets and outlets for liquid or vapor. A 3.2 mm. O.D. nickel tube thermowell was placed at the center of the reactor.

The reactor was charged with 23 gms. (25 cc.) of 0.5% Pd on 14 mesh activated alumina catalyst (identical with that of Example 1 and similarly pretreated), and set vertically. The reactor was connected directly to a glass collector tube which was cooled in crushed ice. Steam was passed through the reactor jacket until the catalyst bed was at 100° C. While maintaining the steam flow in the jacket, hydrogen was passed through the system at 100 cc./min. and one atmosphere pressure for a period of 30 minutes. Then, a mixture of hexafluoroacetone at 90 cc./min. and hydrogen at about 105 cc./min. was passed through the reactor at about 1 atmosphere pressure, there being a slight pressure drop across the catalyst of say about 10–20 mm. Hg. The hot spot temperature reached about 130–140° C. Operation was continued for a two hour period and, during this time, 73.0 gms. of hexafluoroisopropanol was collected in the ice cooled trap. The yield of hexafluoroisopropanol was 98%. Vapor phase chromatography indicated that the crude hexafluoroisopropanol contained about 0.1% of unreacted hexafluoroacetone.

In a second run using the same catalyst at 100° C., 160 gms. of hexafluoroacetone was fed over a period of 4.5 hours at about atmospheric pressure and a hot spot temperature of about 130–140° C., giving 162 g. of hexafluoroisopropanol (97%).

Example 4.—Hydrogenation of trifluoroacetonitrile

Using the reaction system of Example 3 and a catalyst charge of 23.1 gms. (25 cc.) of the same 0.5% Pd on 14 mesh activated alumina catalyst, the catalyst bed was heated to 100° C. by means of steam in the jacket. While maintaining steam in the jacket, trifluoroacetonitrile (45 cc./min.) and hydrogen (120 cc./min.) at about atmospheric pressure was passed over the catalyst. The "hot spot" at the top of the catalyst bed reached 160° C., and remained at that temperature during the reaction. The liquid product collected was found by vapor phase chromatography and mass spectroscopy to be 2,2,2-trifluoroethylamine (83% yield) and bis(2,2,2 - trifluoroethyl)amine, $(CF_3CH_2)_2NH$ (17% yield).

Example 5.—Hydrogenation of fluoral

Using the reaction system and catalyst of Example 3, and a charge of 33 gms. of the catalyst, fluoral (trifluoroacetaldehyde) (90 cc./min.) and hydrogen (105 cc./min.) were passed over the steam-cooled catalyst bed at about atmospheric pressure. The hot spot in the catalyst bed reached a temperature of 140° C. The product, 2,2,2-trifluoroethanol (86% yield) was collected and identified by mass spectroscopy. No polymerization of fluoral on the catalyst bed was noted during the hydrogenation reaction.

Example 6

Example 1 was repeated using a palladium on activated charcoal catalyst in place of the palladium on activated alumina catalyst. This catalyst was a commercial product prepared and pretreated in the same manner as the Pd on activated alumina catalyst. Under the same conditions as Example 1, only small amounts of hexafluoroisopropanol were obtained from hexafluoroacetone, apparently less than 1% of the product as determined by vapor phase chromatography.

Similar poor results were obtained on using a platinum catalyst, a commercial Adams catalyst, under the same conditions, it being well known in the art that said catalyst is reduced to metallic platinum in colloidal form on first contact with hydrogen.

It will be understood that the preceding examples are given for illustrative purposes solely, and that this invention is not limited to the specific embodiment described therein. On the other hand, it will be readily apparent to those skilled in the art that, subject to the limitations set forth in the general description, many variations and modifications can be made in the materials treated, and in the proportions, conditions, techniques, and apparatus employed without departing from the spirit or scope of this invention.

From the foregoing description, it will be apparent that this invention provides a new and improved process for the hydrogenation of perfluoroaldehydes, perfluoroketones and perfluoronitriles to produce highly fluorinated alcohols and amines in high yields. Such process employs a novel catalyst for those reactions, which does not require the high temperatures and/or pressures that have been required in the processes of the prior art, whereby the desired products are readily obtained in a much more economical manner, i.e. at less cost. Accordingly, it will be apparent that this invention constitutes a valuable advance in and contribution to the art.

The embodiments of the invention in which an exclusive property or privilege is claimed are defined as follows:

1. A hydrogenation process for preparing fluorinated alcohols which comprises
    (A) contacting with a catalyst which consists of from about 0.1% to about 1% by weight of metallic palladium on activated alumina
    (B) at a temperature of from about 25° C. to about 170° C. and about 1 atmosphere pressure
    (C) a vapor phase mixture of a perfluoro compound of the group consisting of compounds having the formula $R_f$—CO—$R_f$ and $R_f$—CHO wherein $R_f$ represents a perfluoroalkyl group of 1–12 carbon atoms and which perfluoro compound has a vapor pressure of at least 0.5 atmosphere at the temperature of the catalyst
    (D) and at least 1 stoichiometric amount of hydrogen, and
    (E) recovering from the reaction mixture a corresponding member of the group consisting of compounds of the formula $R_f$—CHOH—$R_f$ and $R_f$—CH$_2$OH.

2. A hydrogenation process for preparing fluorinated alcohols which comprises
    (A) contacting with a catalyst which consists of about 0.5% by weight of metallic palladium on activated alumina
    (B) at a temperature of from about 100° C. to about 160° C. and about 1 atmosphere pressure
    (C) a vapor phase mixture of a perfluoro compound of the group consisting of compounds having the formula $R_f$—CO—$R_f$ and $R_f$—CHO wherein $R_f$ represents a perfluoroalkyl group of 1–12 carbon atoms and which perfluoro compound has a vapor pressure of at least 0.5 atmosphere at the temperature of the catalyst
    (D) and at least 1 stoichiometric amount of hydrogen, and
    (E) recovering from the reaction mixture a corresponding member of the group consisting of compounds of the formula $R_f$—CHOH—$R_f$ and $R_f$—CH$_2$OH.

3. A hydrogenation process for preparing fluorinated alcohols which comprises
    (A) contacting with a catalyst which consists of from about 0.1% to about 1% by weight of metallic palladium on activated alumina
    (B) at a temperature of from about 25° C. to about 170° C. and about 1 atmosphere pressure
    (C) a vapor phase mixture of a perfluoroketone of the formula $R_f$—CO—$R_f$ wherein $R_f$ represents a perfluoroalkyl group of 1–12 carbon atoms and which perfluoroketone has a vapor pressure of at least 0.5 atmosphere at the temperature of the catalyst
    (D) and at least 1 stoichiometric amount of hydrogen, and
    (E) recovering from the reaction mixture the corresponding alcohol of the formula $R_f$—CHOH—$R_f$.

4. A hydrogenation process for preparing fluorinated alcohols which comprises
    (A) contacting with a catalyst which consists of about 0.5% by weight of metallic palladium on activated alumina
    (B) at a temperature of from about 100° C. to about 160° C. and about 1 atmosphere pressure
    (C) a vapor phase mixture of a perfluoroketone of the formula $R_f$—CO—$R_f$ wherein $R_f$ represents a perfluoroalkyl group of 1–12 carbon atoms and which perfluoroketone has a vapor pressure of at least 0.5 atmosphere at the temperature of the catalyst
    (D) and at least 1 stoichiometric amount of hydrogen, and
    (E) recovering from the reaction mixture the corresponding alcohol of the formula $R_f$—CHOH—$R_f$.

5. A hydrogenation process for preparing 1,1,1,3,3,3-hexafluoropropan-2-ol which comprises
    (A) contacting with a catalyst which consists of from about 0.1% to about 1% by weight of metallic palladium on activated alumina
    (B) at a temperature of from about 100° C. to about 160° C. and about 1 atmosphere pressure
    (C) a vapor phase mixture of hexafluoroacetone
    (D) and at least 1 stoichiometric amount of hydrogen, and
    (E) recovering from the reaction mixture 1,1,1,3,3,3-hexafluoropropan-2-ol.

6. A hydrogenation process for preparing 1,1,1,3,3,3-hexafluoropropan-2-ol which comprises
    (A) contacting with a catalyst which consists of about 0.5% by weight of metallic palladium on activated alumina
    (B) at a temperature of from about 100° C. to about 140° C. and about 1 atmosphere pressure
    (C) a vapor phase mixture of hexafluoroacetone
    (D) and at least 1 stoichiometric amount of hydrogen, and
    (E) recovering from the reaction mixture 1,1,1,3,3,3-hexafluoropropan-2-ol.

7. A hydrogenation process for preparing fluorinated alcohols which comprises
    (A) contacting with a catalyst which consists of from about 0.1% to about 1% by weight of metallic palladium on activated alumina
(B) at a temperature of from about 25° C. to about 170° C. and about 1 atmosphere pressure
(C) a vapor phase mixture of a perfluoroaldehyde of the formula $R_fCHO$ wherein $R_f$ represents a perfluoroalkyl group of 1–12 carbon atoms and which perfluoroaldehyde has a vapor pressure of at least 0.5 atmosphere at the temperature of the catalyst
(D) and at least 1 stoichiometric amount of hydrogen, and
(E) recovering from the reaction mixture the corresponding alcohol of the formula $R_f$—$CH_2OH$.

8. A hydrogenation process for preparing fluorinated alcohols which comprises
(A) contacting with a catalyst which consists of about 0.5% by weight of metallic palladium on activated alumina
(B) at a temperature of from about 100° C. to about 160° C. and about 1 atmosphere pressure
(C) a vapor phase mixture of a perfluoroaldehyde of the formula $R_f$—CHO wherein $R_f$ represents a perfluoroalkyl group of 1–12 carbon atoms and which perfluoroaldehyde has a vapor pressure of at least 0.5 atmosphere at the temperature of the catalyst
(D) and at least 1 stoichiometric amount of hydrogen, and
(E) recovering from the reaction mixture the corresponding alcohol of the formula $R_f$—$CH_2OH$.

9. A hydrogenation process for preparing 2,2,2-trifluoroethanol which comprises
(A) contacting with a catalyst which consists of from about 0.1% to about 1% by weight of metallic palladium on activated alumina
(B) at a temperature of from about 100° C. to about 160° C. and about 1 atmosphere pressure
(C) a vapor phase mixture of trifluoroacetaldehyde
(D) and at least 1 stoichiometric amount of hydrogen, and
(E) recovering from the reaction mixture 2,2,2-trifluoroethanol.

10. A hydrogenation process for preparing 2,2,2-trifluoroethanol which comprises
(A) contacting with a catalyst which consists of about 0.5% by weight of metallic palladium on activated alumina
(B) at a temperature of from about 100° C. to about 140° C. and about 1 atmosphere pressure
(C) a vapor phase mixture of trifluoroacetaldehyde
(D) and at least 1 stoichiometric amount of hydrogen, and
(E) recovering from the reaction mixture 2,2,2-trifluoroethanol.

References Cited
UNITED STATES PATENTS

| | | |
|---|---|---|
| 2,546,019 | 3/1951 | Smith. |
| 2,561,530 | 7/1951 | Montgomery _____ 252—472 |
| 2,647,146 | 7/1953 | Arthur. |
| 2,690,456 | 9/1954 | Renfrew et al. |
| 2,824,897 | 2/1958 | Wujciak et al. |
| 3,061,644 | 10/1962 | Fierce et al. |
| 3,117,162 | 1/1964 | Rylander et al. |
| 3,177,258 | 4/1965 | Rylander et al. |
| 3,356,742 | 12/1967 | Ford _____ 260—633 |

LEON ZITVER, Primary Examiner

HOWARD T. MARS, Assistant Examiner

U.S. Cl. X.R.

260—583